United States Patent
McFarthing

(10) Patent No.: US 11,791,865 B2
(45) Date of Patent: Oct. 17, 2023

(54) NEAR ELECTRIC FIELD COMMUNICATION

(71) Applicant: QUALCOMM Incorporated, San Diego, CA (US)

(72) Inventor: Anthony McFarthing, Ely (GB)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/799,544

(22) Filed: Feb. 24, 2020

(65) Prior Publication Data

US 2021/0266041 A1 Aug. 26, 2021

(51) Int. Cl.
*H04B 5/00* (2006.01)
*H04B 5/02* (2006.01)
*H04B 13/00* (2006.01)

(52) U.S. Cl.
CPC ......... *H04B 5/0012* (2013.01); *H04B 5/0081* (2013.01); *H04B 5/02* (2013.01); *H04B 13/005* (2013.01)

(58) Field of Classification Search
CPC ...... H04B 5/0012; H04B 5/02; H04B 13/005; H04B 5/0081; H04B 5/0031; H04B 5/0093; G08C 17/04; H01Q 1/273; H04R 25/55; H04R 25/554; H04R 25/00; H04R 25/60; H04R 25/558; H01F 2038/143; H01F 2038/146; G16H 20/40; A61B 5/002

See application file for complete search history.

(56) References Cited

U.S. PATENT DOCUMENTS

| | | | | |
|---|---|---|---|---|
| 11,158,149 | B2* | 10/2021 | Robertson | A61B 5/053 |
| 2011/0294421 | A1* | 12/2011 | Hebiguchi | H04B 13/005 |
| | | | | 455/41.1 |
| 2015/0312704 | A1 | 10/2015 | Tarnhed et al. | |
| 2015/0318932 | A1* | 11/2015 | Kerselaers | H04R 25/55 |
| | | | | 381/315 |
| 2015/0319545 | A1* | 11/2015 | Kerselaers | H04R 25/558 |
| | | | | 381/315 |
| 2017/0272128 | A1* | 9/2017 | Tanaka | H04B 5/0081 |
| 2019/0089416 | A1* | 3/2019 | Nekozuka | H04B 5/0031 |

FOREIGN PATENT DOCUMENTS

| | | | |
|---|---|---|---|
| EP | 3139816 | A1 | 3/2017 |
| EP | 3586743 | A1 | 1/2020 |

OTHER PUBLICATIONS

International Search Report and Written Opinion—PCT/US2021/015792—ISA/EPO—dated Jul. 2, 2021.
Partial International Search Report—PCT/US2021/015792—ISA/EPO—dated May 3, 2021.

* cited by examiner

*Primary Examiner* — Lester G Kincaid
*Assistant Examiner* — Maryam Soltanzadeh
(74) *Attorney, Agent, or Firm* — MG-IP Law, P.C.

(57) ABSTRACT

Techniques to enable near field communication using electric field (E-field) are proposed. When the wavelength of a signal is long relative to the human body, the human body can behave as a conductive hollow cylinder. By capacitively coupling the human body with a transmitter and/or a receiver, the human body itself can be used as a communication medium.

32 Claims, 8 Drawing Sheets

NEAR ELECTRIC FIELD COMMUNICATION

FIELD OF DISCLOSURE

One or more aspects of the present disclosure generally relate to wireless communication, and in particular, to near electric field communication.

BACKGROUND

Communications concerning any human body interaction have to date been problematic. This is due primarily to interaction of electric fields (E-fields) with the human body at radio frequencies (RF). The human body can absorb, reflect and refract RF signals and thereby distort them. In other words, the human body is capable of interacting with radio signals that makes communications with body worn transducers acting as transmitters and receivers problematic by producing a poor link budget. The high absorption of RF signals by the body may significantly contribute to the poor link budget. The interaction of RF signals with the human body is particularly strong at frequencies above 1 GHz.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary apparatus is disclosed. The apparatus may be configured to perform near field communications. The apparatus may comprise a transceiver, a memory, and a processor. The processor may be operatively coupled with the transceiver and/or the memory. The processor, the memory, and/or the transceiver may be configured to receive a first signal from a remote apparatus. The first signal may be an electrical signal. The electrical signal may be a voltage signal on a human body or an electric field (E-field) signal present on or emanating from the human body.

An exemplary method of an apparatus configured to perform near field communications is disclosed. The method may comprise receiving a first signal from a remote apparatus. The first signal may be an electrical signal. The electrical signal may be a voltage signal on a human body or an E-field signal present on or emanating from the human body.

Another exemplary apparatus configured to perform near field communications is disclosed. The apparatus may comprise means for receiving a first signal from a remote apparatus. The first signal may be an electrical signal. The electrical signal may be a voltage signal on a human body or an E-field signal present on or emanating from the human body.

An exemplary computer-readable medium is disclosed. The computer-readable medium may store one or more instructions executable by an apparatus configured to perform near field communications. The computer-readable medium may comprise one or more instructions configured to cause the apparatus to receive a first signal from a remote apparatus. The first signal may be an electrical signal. The electrical signal may be a voltage signal on a human body or an E-field signal present on or emanating from the human body.

A further exemplary apparatus is disclosed. The apparatus may be configured to perform near field communications. The apparatus may comprise a transceiver, a memory, and a processor. The processor may be operatively coupled with the transceiver and/or the memory. The processor, the memory, and/or the transceiver may be configured to transmit a first signal to a remote apparatus. The first signal may be an electrical signal. The electrical signal may be a voltage signal induced onto a human body or an E-field signal provided to the human body.

Another exemplary method of an apparatus configured to perform near field communications is disclosed. The method may comprise transmitting a first signal to a remote apparatus. The first signal may be an electrical signal. The electrical signal may be a voltage signal induced onto a human body or an E-field signal provided to the human body.

A yet further exemplary apparatus configured to perform near field communications is disclosed. The apparatus may comprise means for transmitting a first signal to a remote apparatus. The first signal may be an electrical signal. The electrical signal may be a voltage signal induced onto a human body or an E-field signal provided to the human body.

Another exemplary computer-readable medium is disclosed. The computer-readable medium may store one or more instructions executable by an apparatus configured to perform near field communications. The computer-readable medium may comprise one or more instructions configured to cause the apparatus to transmit a first signal to a remote apparatus. The first signal may be an electrical signal. The electrical signal may be a voltage signal induced onto a human body or an E-field signal provided to the human body.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
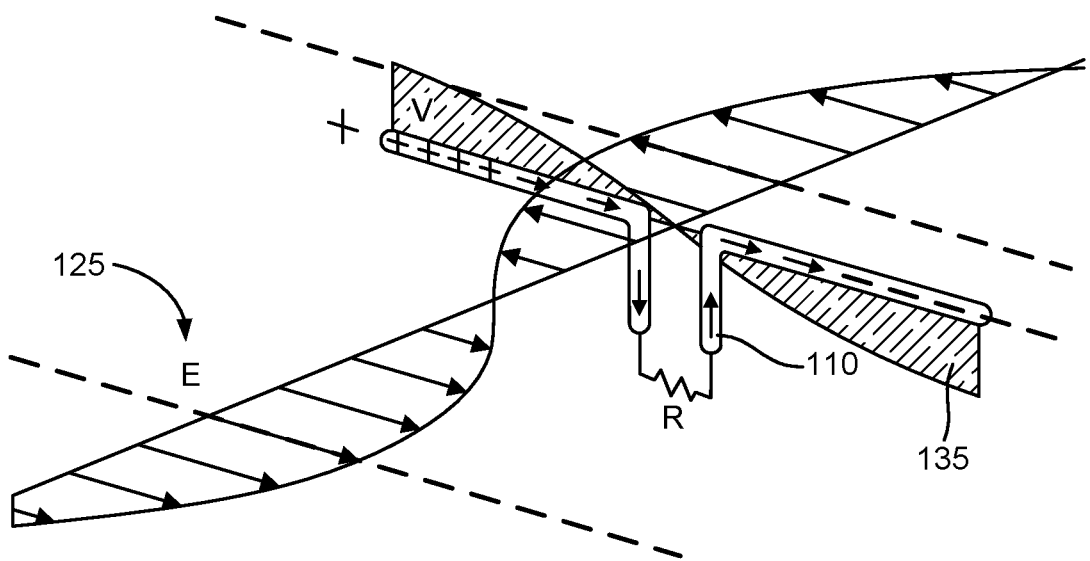
FIG. 1 illustrates an example dipole antenna.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Recall from above that the human body is capable of interacting with RF signals. As such, communications with body worn transducers acting as transmitters and receivers can be problematic mainly due to high absorption of RF signals by the body. There is anecdotal evidence for this as higher power transmitters (e.g., greater than one watt) do to have the capability of causing headaches when transmitters are placed close to the human head. There are also limits on the permitted absorption of RF signals by the brain as it can cause heating.

One way to address this is to use magnetic field induction for communication between a transmitter and a receiver since there is very little interaction between the human body and magnetic signals. Near Ultra Low Energy Field (NULEF) was first developed because of the low interaction between the human body and magnetic signals thus producing a solution to communications through the human body. The effect is that the human body is virtually invisible to magnetic NULEF signals (i.e., NULEF-H signals).

A published research paper, 'Characterising the Human Body as a Monopole Antenna', Kibret et all, IEEE Trans V63, #10 Oct. 2015 (incorporated by reference in its entirety), shows that the skin of the human body is a highly conductive medium while the more internal organs are much less so. Thus, the human body can be thought of as a hollow electrically conductive cylinder. At NULEF frequencies (e.g., 9 to 22 MHz), the wavelength is of the order of 20 m, and the human body can be approximated by a doublet antenna.

Thus, in an aspect, it is proposed to use the human body as a communication medium to enable communications (rather than as is true for the 2.4 GHz ISM band in which the human body impedes communication). Using the human body as a communication medium can be enabled by correctly choosing TX and RX transducers and operating frequency that allows the human body to act as a hollow conductive cylinder. It should be noted that relative to RF communications in the GHz band, there is an insignificant level of power absorbed by the body with the proposed aspect.

In the proposed aspect, E-field communications, such as NULEF-E, may be enabled using the human body. For example, earbuds, watches, handsets (e.g., user equipments) may communicate with one another through NULEF-E. These may be generally be categorized as being components of a body area network (BAN).

For explanation purposes, FIG. 1 illustrates an example of a centre fed half-wave dipole antenna 110. The antenna 110 is a reciprocal device that will either 1) produce electromagnetic (EM) radiation as a transverse EM wave that is emitted from the antenna 110 upon injecting an RF signal into the antenna terminals from an RF signal source (not shown), or 2) if placed in a position where an EM signal is passing through it, the antenna 110 will produce a signal voltage at the antenna terminals.

As the name implies, EM signal has both electric and magnetic components. However, for the moment, focus of the discussion will be on the electric component. E-Field 125 is generated by the presence of charged particles (either an excess or deficiency of free electrons) as shown by the + and − signs in FIG. 1, which shows the corresponding E-field 125 surrounding the antenna 110. At the frequency of operation, the length of the dipole antenna 110 is exactly half a wavelength of the signal driving the antenna 110. As a consequence, a standing wave 135 is created along the antenna 110.

Figure 2A:
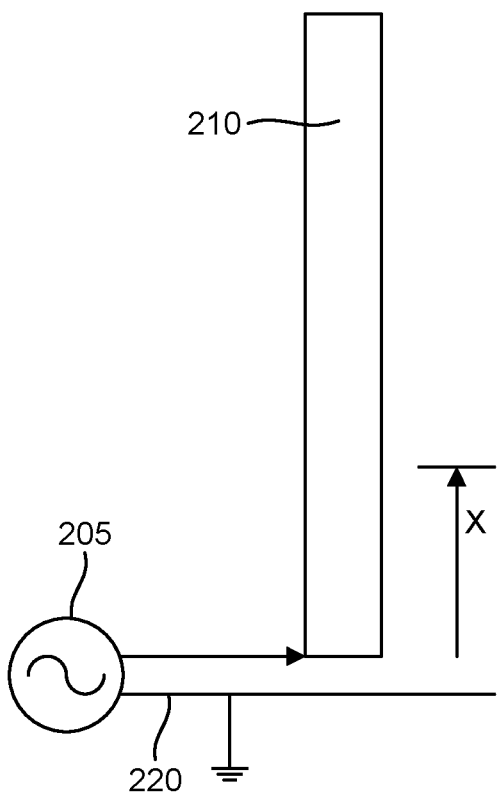
FIGS. 2A and 2B illustrate an example quarter-wave monopole antenna with a charge distribution with ground connection.
Figure 2B:
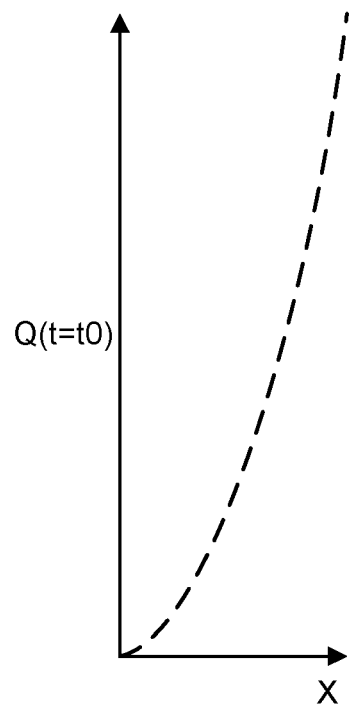

A standing wave may also be generated with a quarter-wave monopole antenna 210 such as illustrated in FIGS. 2A and 2B. Charge distribution with ground connection is shown for completeness to describe the signal source. For NULEF-E operation, the signal source may not be required. In FIG. 2A, a signal source 205 is shown as driving the quarter-wave monopole antenna 210. A ground plane 220 may be used to reflect the missing half of a dipole to produce a similar charge distribution across the length of the antenna 210 as a standing wave as shown in FIG. 2B. In particular, FIG. 2B illustrates a distribution of charges Q at a particular point in time t0. In FIG. 2B, the horizontal axis represents a distance X along the monopole antenna 210 from the ground plane 220, and the vertical axis represents the charge Q at the distance X. Main reason for the standing wave existing on the dipole and monopole antennas is the velocity of light as it takes a finite amount of time for charge carriers to travel along the antenna which produces both voltage and current standing waves.

Figure 3A:
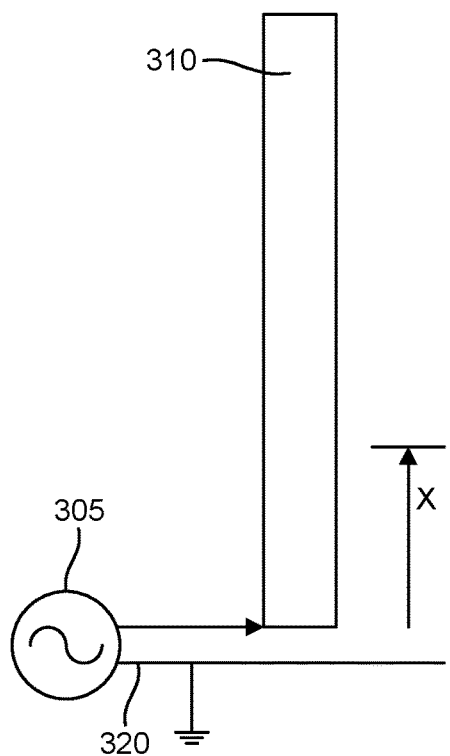
FIGS. 3A and 3B illustrate an antenna whose length is short relative to operation wavelength and charge distribution.
Figure 3B:
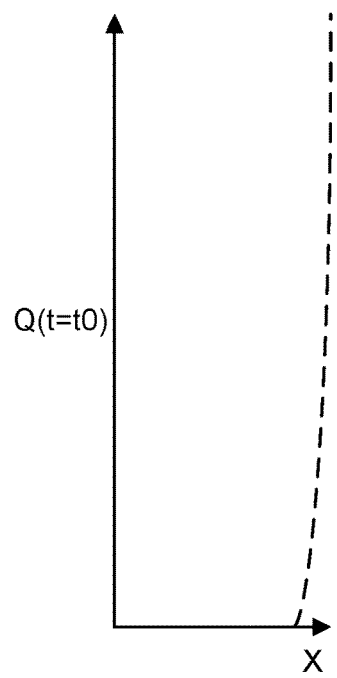

FIGS. 3A and 3B illustrate an antenna 310 with a different charge distribution along the antenna 310. In FIG. 3A, an antenna setup similar to that of FIG. 2A is shown. The setup includes a signal source 305 and a ground plane 320 in addition to the antenna 310. But unlike FIG. 2A, it is assumed that the antenna 310 is relatively short with respect to the the wavelength of operation. That is, the antenna 310 may be considered to be a doublet antenna. The ground plane connected to the signal source has been drawn to complete the usual circuit for a signal source. The voltage at the signal source output changes, and charges flow in the doublet through diffusion, as a function of time independently of whether the ground plane is present or not.

Assuming that the signal source 305 can drive the low impedance of the doublet antenna 310, FIG. 3B illustrates an example charge distribution along the length of the antenna 310. Due to the velocity of light and the finite length of the doublet antenna 310, there may be some variation in charge distribution as shown. However, if the length of the doublet antenna 310 is much smaller than the signal's wavelength, then the charge distribution can be reasonably constant. This means that the voltage across the length of the antenna 310 can be the same as the inputted voltage.

Recall that in an aspect, the human body may be thought of as a hollow electrically conductive cylinder. At NULEF frequencies of 9 to 22 MHz, the wavelength ranges between 13.6 m and 33.3 m. At these wavelengths, the human body can be approximated by a doublet antenna.

Figure 4:
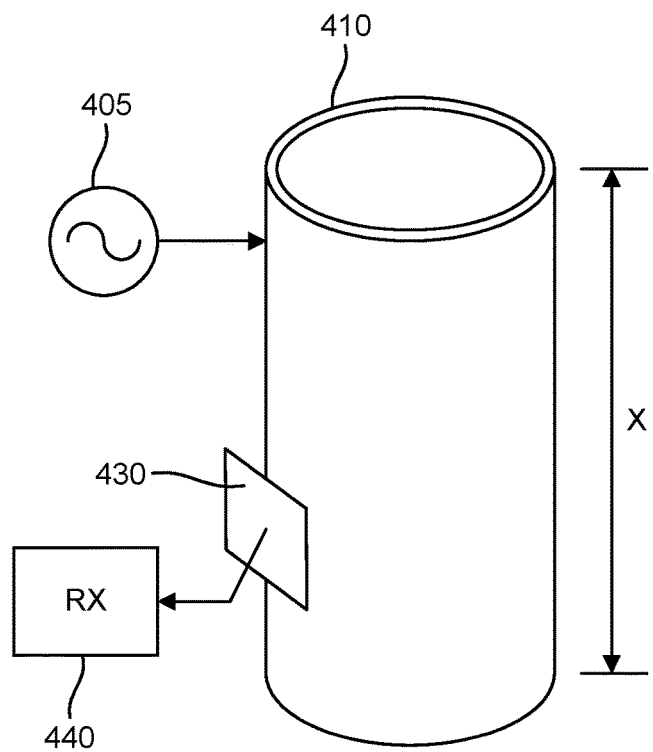
FIG. 4 illustrates an antenna setup with a hollow electrically conductive cylinder antenna as an approximation of a human body.

FIG. 4 illustrates an antenna setup with a hollow conductive cylinder antenna 410 as an approximation of a human body. In FIG. 4, it is assumed that the antenna 410 is acting as a doublet antenna, i.e., an antenna whose length is very short relative to the wavelength of operation. Suppose that there is a voltage or current source that can supply a current at the point of contact with the skin of the body, i.e., the doublet antenna 410, making the voltage at the point of contact the same as the signal source. If the signal source operates in the NULEF frequency band, then the voltage would be a sinewave (assuming no modulation) at the point of contact. As the human body approximates the conductive cylinder and the length of the human body makes it behave like a doublet, the voltage at the surface of the human body, while allowing for some ohmic loss, can be considered to be constant as described earlier for a doublet antenna. In short, the body may simply behave as a short piece of wire that is at the same potential or voltage as the driving source.

Therefore, charged particles may travel across the human body, and may vary in concentration at skin surface producing E-field across the whole body. FIG. 4 illustrates that a small capacitive transducer 430 placed close to or even touching the human body, i.e., close to or touching the antenna 410, may by capacitive action produce a voltage at the surface of the transducer 430 which can be detectable with a NULEF-E receiver 440.

Figure 5:
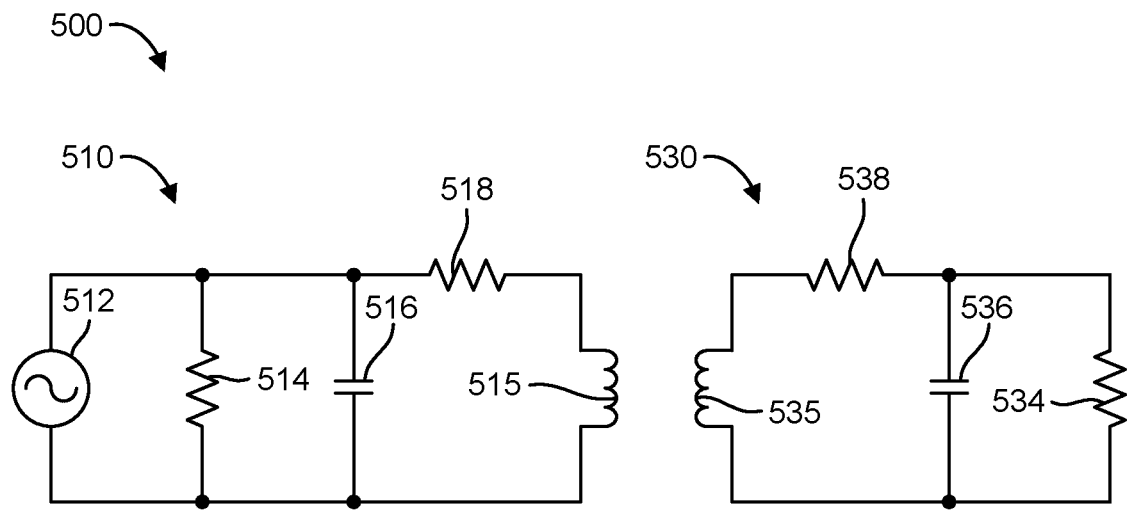
FIG. 5 illustrates an example a near ultra low energy field (NULEF) magnetic system.

Typically, NULEF-H is a system that uses magnetic field induction for communication between a transmitter and a receiver. FIG. 5 illustrates an example NULEF-H system 500 that includes a transmitter (TX) 510 and a receiver (RX) 530. The TX 510 may include a signal driver 512 (e.g., a power amplifier) whose outputs are connected to inputs of an antenna 515. The antenna 515 may be in a form of a coil. Thus the antenna 515 may also be referred to antenna coil or antcoil. One purpose of the antcoil 515 is to produce magnetic fields to enable communication through magnetic inductance. The TX 510 may also include a resistor 514 and a capacitor 516 connected to the outputs of the signal driver 512 in parallel with the antcoil 515, and a resistor 518 connected in series between the signal driver 512 and the antcoil 515.

The RX 530 may include an antcoil 535. In this instance, one purpose of the antcoil 535 is to efficiently detect magnetic fields produced by the antcoil 515. The RX 530 may also include a capacitor 536 and a resistor 534 connected in parallel with the antcoil 535. As indicated, communication between the TX 510 and the RX 530 may be accomplished via magnetic induction between the antcoils 515, 535. The NULEF-H system 500 can actively suppress any far-field E-fields by making the TX and RX 510, 530 have a balanced driver and receiver. It can be shown by Maxwell's second law that this suppresses E-Fields further away from the antcoils.

Figure 6:
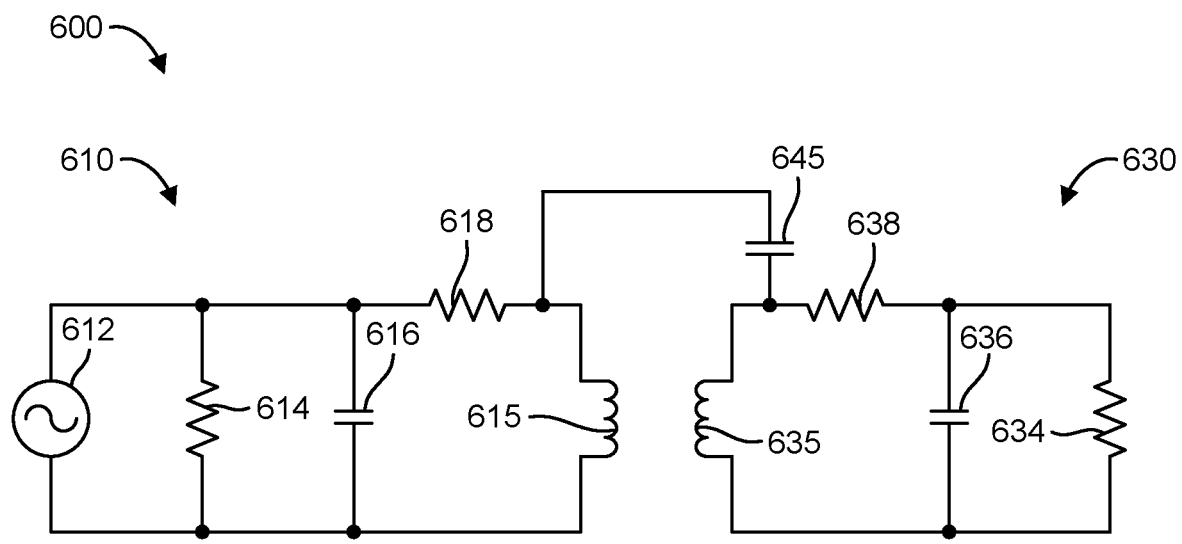
FIG. 6 illustrates an example of a near electrical communication system.

But in an aspect, it is proposed to configure a system for communication through E-fields. An example communication system 600 capable of near E-field communication is illustrated in FIG. 6. For example, the system 600 may be a NULEF system with NUFLE-E capabilities. More generally, the system 600 may be an example of a near electric field communication system. At a glance, the structure of the NULEF system 600 may seem very similar to the NULEF-H system 500 of FIG. 5.

However, there is at least one very important difference. As mentioned above, the NULEF-H system 500 actively suppresses E-fields. On the other hand, rather than suppressing the E-fields, the NULEF system 600 can be structured to actually utilize electrical signals (voltages, E-fields) for communication.

As seen, the NULEF system 600 may include a TX 610 and an RX 630. The TX 610 may include a signal driver 612 (e.g., current and/or voltage source) whose outputs are connected to inputs of a field producer 615. The TX 610 may also include a resistor 614 and a capacitor 616 connected to the outputs of the signal driver 612 in parallel with the field producer 615, and a resistor 618 connected in series between the signal driver 612 and the field producer 615.

The field producer 615 may be configured to produce or otherwise generate voltage and/or E-field in accordance with the signal from the signal driver 612. Alternatively or in addition thereto, the field producer 615 may be configured to produce or generate H-field (similar to the antcoil 515) in accordance with the signal from the signal driver 612. Thus, in addition to being NULEF-E capable, the TX 610 may also be NULEF-H capable.

The field producer 615 may be configured to capacitively couple with human body when brought close to or in contact with the human body. For example, when the field producer 615 is brought into contact, voltage on the skin may be induced by voltage across the field producer 615. On the other hand, if the field producer 615 does not contact the skin, but is brought close enough, then E-field can be from the field producer 615 can be directed or otherwise provided to the skin, which can also induce voltage in the same way a capacitor does in normal circuit operation. The source of the voltage and electric field is the presence of electric charges, namely electrons, moving across the surface or close to the surface of the human body which enables the NULEF-E effect.

The RX 630 may include a field receiver 635. The RX 630 may also include a capacitor 636 and a resistor 634 connected in parallel with the field receiver 635. The field receiver 635 may be configured to receive or otherwise detect voltage and/or an E-field. Alternatively or in addition thereto, the field receiver 635 may be configured to detect H-field (similar to the antcoil 535). Thus, in addition to being NULEF-E capable, the RX 610 may also be NULEF-H capable as an inductor can output a voltage due to Faraday's Law of Induction or a voltage due to the parasitic capacitance between the antcoil and the skin.

The field receiver 635 may be configured to capacitively couple with human body when brought close to or in contact with the human body. For example, the field receiver 635 is brought into contact, voltage on the skin may be detected by the field receiver 635. On the other hand, if the field receiver 635 does not contact the skin, but is brought close enough, then E-field emanating from the skin (due to voltage induced by the field producer 615) can be detected by the field receiver 635.

A description regarding NULEF-E is as follows. A voltage may be produced at a tuned field producer (e.g., at field producer 615) due to a signal source (e.g., signal driver 612) driving the tuned TX (e.g., TX 610). In an embodiment, the RX 630 may be configured to capacitively couple with the human body when it is brought close to or physically contacts the skin. For example, the RX 630 may be a part of an earbud, in which case, the contact would be with the ear. When the RX 630 physically contacts the skin, the whole body may behave as a piece of wire.

Assume that an example of the field receiver 635 is embodied as a planar antcoil having some surface area and some number of turns or coils so either this surface or the surface of a separate electrode connected to 635, will form a capacitance with the surface of the skin. Wherever a capacitive transducer (e.g., capacitive transducer 430 of FIG. 4) is placed on the body, at a hand, in a pocket, at a foot, etc., a capacitor 645 may be formed between the field receiver 635 and the skin. In particular, the capacitor may be formed between surface of the turns of the antcoil and the surface of the skin. If either an intentional electrode or a capacitively coupled antcoil comes into contact with the skin, any capacitive coupling is bypassed and the voltage on the skin or to be induced in the skin is connected directly to the NULEF transmit or receiver, enabling operation to proceed normally. In short, capacitive coupling or ohmic contact can be formed when the field receiver 635 (e.g., antcoil) comes close or into contact with the skin.

More generally, the RX 630 may be configured such that an electrical coupling between the skin and the field receiver 635 when the skin is brought into physical contact with the RX 630. As an illustration, assume that an example of the RX 630 is embodied in an earbud. The antcoil 635, at least in part, may be exposed at a surface of the earbud. Then when a user inserts the earbud to his/her ear, the exposed part of the antcoil 635, which is assumed to be conductive, may come close or contact the user's skin such that ohmic or capacitive coupling is formed. In either case NULEF signals can be transferred through the medium of the body.

Note this is unlike most typical mobile devices (e.g., Bluetooth earbuds, Bluetooth watches, handsets, etc.) in which conductive parts are either insulated at all times (such as wires) or are designed such that they are not exposed when used (e.g., when speaker jack is inserted).

As indicated above, the field receiver 635 may be embodied in an antcoil having some surface area and some number of coils. The surface area may be figured based on a desired capacitance. Alternatively or in addition thereto, the coils may be configured based on a desired inductance or an ohmic resistance to the skin.

It should be noted that the field receiver 635 of the RX 630 is not limited to coils. For example, the field receiver 635 may be a plane plate. However, a coil may be advantageous over a plane plate in that the coil can provide voltage amplification and attenuation of out-of-band signals and noise. In an alternative, the field receiver 635 may comprise an antcoil (for H-field) and a capacitive plate (for E-field), and the capacitive plate can be configured to be in contact with the skin when used in operation.

Similarly, the field producer 615 of the TX 610 embodied in an antcoil having some surface area and some number of coils (same or different from the antcoil of the field receiver 635). The surface area may be figured based on a desired capacitance, and/or the coils may be configured based on a desired inductance.

The field producer 615 is also not limited to coils. For example, the field producer 615 may be a plane plate. But again, a coil may be advantageous. Alternatively, the field producer 615 may comprise an antcoil (for H-field) and a capacitive plate (for E-field), and the capacitive plate can be configured to be in contact with the skin when used in operation.

Above, it is described that the capacitive coupling can be formed between the skin and the RX 630. Alternatively or in addition thereto, a capacitive coupling may be formed between the skin and the TX 610. That is, the TX 610 may be configured such that an electrical coupling between the skin and the TX 610 (e.g., between the skin and the field producer 615) when the skin is brought into physical contact with the TX 610.

In short, the capacitive coupling can be enabled with the TX 610 and/or with the RX 630. To enable communication between the TX 610 and the RX 630, it is NOT required that both the TX 610 and the RX 630 be in contact with the skin. In one or more aspects, one of them being in contact is sufficient. Preferably, the other of them is "close enough" (e.g., within 20 cm).

Figure 7:
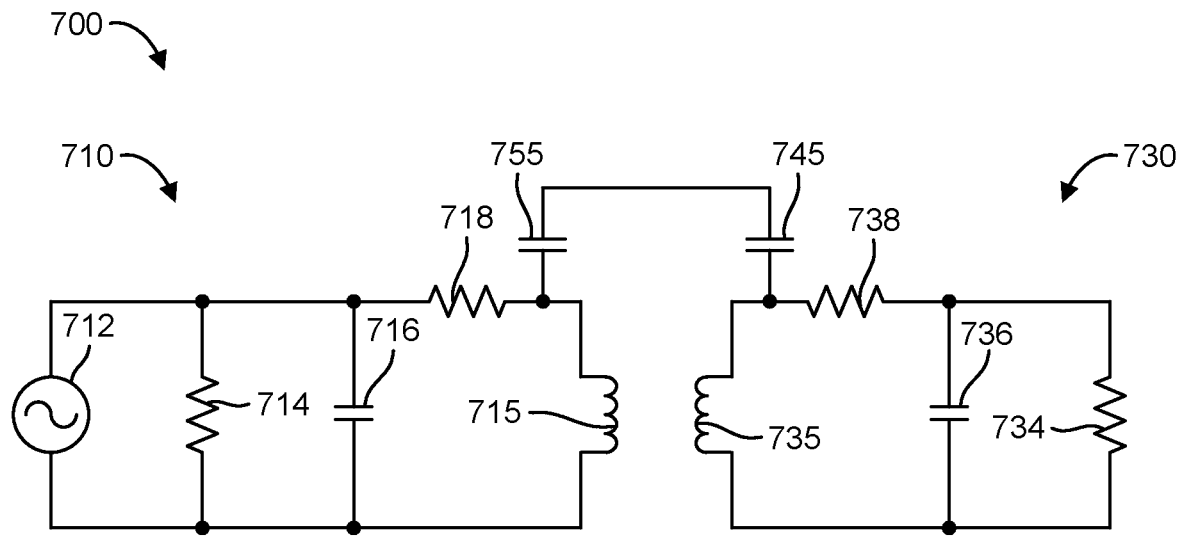
FIG. 7 illustrates another example of a near electrical communication system.

Of course, it is also possible that both the TX and RX be capacitive coupled as shown in FIG. 7, which illustrates an example NULEF system 700. The NULEF system 700 may include a TX 710 and an RX 730. The TX 710, which may be similar to the TX 610, may include a signal driver 712 whose outputs are connected to inputs of a field producer 715 (e.g., antcoil, plate, etc.), a resistor 714, a capacitor 716, and a resistor 718. The RX 730 may include a field receiver 735 (e.g., antcoil, plate, etc.), a capacitor 736, a resistor 738, and a resistor 734.

When the TX 710 physically contacts the skin (e.g., with the field producer 715), a capacitor 755 may be formed between field producer 715 (e.g., the surface of the turns of the antcoil 715) and the surface of the skin, i.e., the TX 710 may be capacitively coupled with the body. Similarly, when the RX 730 physically contacts the skin (e.g., with the field receiver 735), a capacitor 745 may be formed between the field receiver 735 (e.g., the surface of the turns of the antcoil 735) and the surface of the skin, i.e., the RX 730 may be capacitively coupled with the body.

Regarding the NULEF system 600 of FIG. 6, the TX 610 may be a part of one transceiver. Alternatively or in addition thereto, the RX 630 may be a part of another transceiver. Similarly, regarding the NULEF system 700 of FIG. 7, the TX 710 may be a part of one transceiver. Alternatively or in addition thereto, the RX 730 may be a part of another transceiver.

Figure 8:
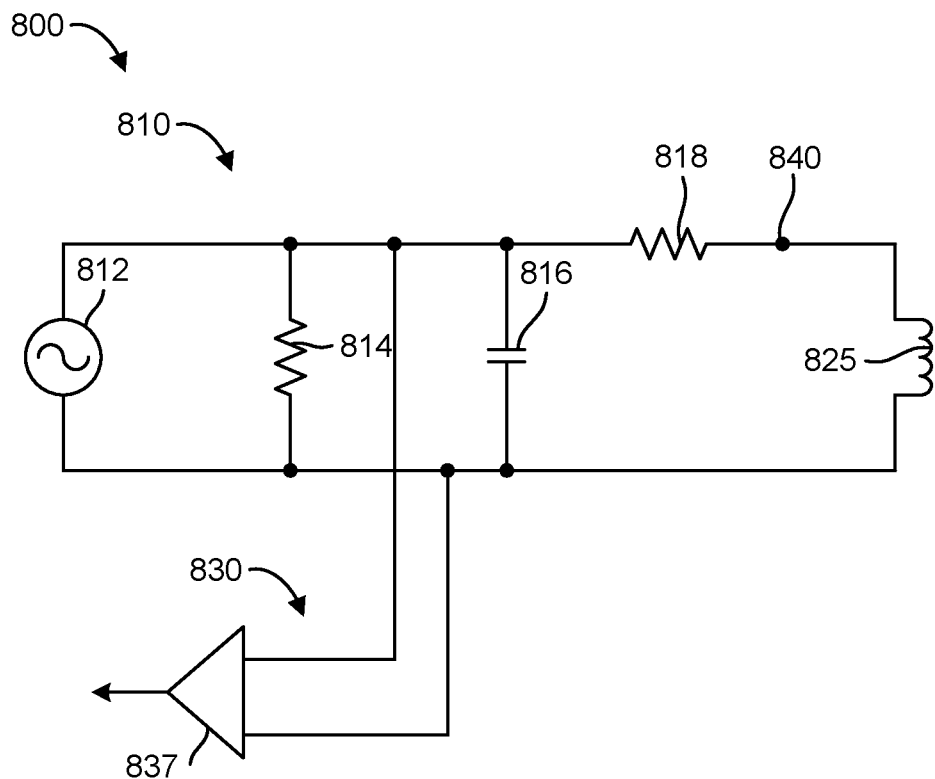
FIG. 8 illustrates an example of a transceiver capable of performing near electrical communication.

FIG. 8 illustrates an example transceiver 800 that includes a TX 810 and an RX 830. The TX 810 may include a signal driver 812, and the RX 830 may include a signal receiver 837 (e.g., a differential input receiver). The transceiver 800 may also include a resistor 814, a capacitor 816, and a field producer/receiver 825 (e.g., antcoil, plate, etc.) common to both the TX 810 and the RX 830. The resistor 814, the capacitor 816, and the field producer/receiver 825 may together be referred to as a tuned circuit. Thus, the tuned circuit may be common to both the TX 810 and the RX 830. The TX 610 and/or 710 of FIGS. 6 and/or 7 may be similar or identical to the TX 810 (e.g., the signal producer 812 and the tuned circuit). Alternatively or in addition thereto, The RX 630 and/or 730 of FIGS. 6 and/or 7 may be similar or identical the RX 830 (e.g., the signal receiver 837 and the tuned circuit).

The transceiver 800 may be a near electric (e.g., NULEF-E) transceiver if a plate (as part of a capacitive connection to the skin) or electrode (to be connected to the skin) were to be connected at point 840. Note that the transceiver may also be a near magnetic (e.g., NULEF-H) transceiver.

In an aspect, during transmission, the signal driver 812 may be enabled and the signal receiver 837 may be disabled. However, the signal receiver 837 may naturally have a high input impedance such that even when it is enabled, the transmission of signals from the signal driver 812 may not be affected or insignificantly affected. During reception, the signal driver 812 may be disabled and the signal receiver 837 may be enabled. But again, the signal driver 812 may be in a naturally high impedance state when not transmitting, and thus minimally affecting (if at all) the reception. This means that if the transceiver 800 operates in a time division multiplex (TDM) mode to interact with another transceiver, explicit enable/disable of the signal driver 812 and/or the signal receiver 837 may not be necessary.

In FIG. 6 (FIG. 7), the TX 610 (710) may be the TX of a first transceiver and the RX 630 (730) may be the RX of a second transceiver. For example, the first transceiver may be one of left and right earbuds and the second transceiver may be the other of the left and right earbuds. From the perspective of the TX 610 (710), the RX 630 (730) that it communicates with is the RX of a remote transceiver. From the perspective of the RX 630 (730), the TX 610 (710) that it communicates with is the TX of a remote transceiver. (Note as shown in FIG. 8 the reactive components in the near field transceiver may be used in either TX or RX modes depending on the mode selected).

Experiments were conducted in which a planar 12 mm antcoil (such as those typically used in earbuds) was used as the TX antcoil (i.e., as the field producer 615, 715), and another planar 12 mm antcoil was used as the RX antcoil (i.e., as the field receiver 635, 735). When part of the TX antcoil was placed in contact with the skin (as a single ended electrode) and the RX coil was placed in a similar way either on the skin or a few centimeters away from the skin, signal levels comparable to normal NULEF-H signals were detected. This indicates that NULEF-E can use, on either TX or RX, electrodes connected to the skin or not connected but close to the skin and therefore capacitively coupled.

When magnetically coupled, signal levels fall as the cube of separation. On the other hand, signal levels for electrically coupled electrodes in free space fall as the square of separation. When a signal at a TX electrode is capacitively coupled or physically connected to the skin, the signal at an RX electrode that is separated from the skin falls as only the inverse of distance, for separations around 20 cm. NULEF-E therefore has the advantage of operating at a distance from a human body making operation with mobile handsets particularly useful.

With an appropriate single ended electrode (that could be part of an antcoil) is either connected to the human body or a few centimeters away, the same received signal levels were observed in experiments. Received signals due to electric effects travel through the body and useful RX signal levels are received for separations of about 2 m, so head to foot or hand to hand. Signals can also be passed to other people through hand to hand contact. This indicates that the NULEF-E can be used to extend the range of communications relative to that of NULEF-H.

The experiments also indicated that physical size of the antcoils was a factor. For example, when the size of the RX antcoil was increased, the level of the signal was also increased. This indicates that standard NFC antenna found in most mobile phones can be used as the field producer/receiver and thereby increase the receive sensitivity of mobile phones to NULEF-E signals due to the relatively large size of the NFC antennas. Larger metal plates can be used. However, plates would not be as tunable as the coil. In an aspect, the NULEF system can be made symmetrical as shown in FIG. 7, so by reciprocity, the system can produce bidirectional communications.

The proposed NULEF systems (e.g., systems 600 and/or 700) can operate very well at frequencies in the NULEF-H band (e.g., 9-22 MHz). Thus, in an aspect, the proposed NULEF systems may be configured to perform NULEF-E communications at similar frequencies. In other words, the NULEF-E band may overlap the NULEF-H band completely or at least in part.

If same or similar channels are used for both NULEF-E and NULEF-H communications, then a TDM approach may be used to minimize interference by ensuring that the same frequency E and H transmissions do not overlap in time. Note that E- and H-fields can destructively interfere at some range of use. Then for NULEF-H communication, it is desirable to suppress E-fields. This can be done using balanced TX and RX operation (e.g., NULEF-H system 500). For NULEF-E operation, single-ended operation (e.g., NULEF systems 600, 700) may be preferable.

But in another aspect, experiments indicate that E-fields operate as well or even better at frequencies higher than the NULEF-H band. It may then be advantageous to assigned separate bands for the NULEF-H and NULEF-E operations. For example, the NULEF-H may be assigned a lower frequency band (e.g., 9-22 MHz) and the NULEF-E may be assigned a higher frequency band (e.g., 22-44 MHz). These bands are merely examples. Indeed, it was found through experiments that upper limit of the higher frequency band can be much higher than 44 MHz (e.g., 50 MHz, 75 MHz, or even 100 MHz).

If the bands for the NULEF-H and NULEF-E operations are separated, then FDM approach may be used. In this approach, a device or apparatus may be capable of simultaneously transmitting and receiving data with another device or apparatus. Again, for NULEF-H communication, balanced TX and RX operation may be preferable, and for NULEF-E operation, single-ended operation may be preferable.

For one or both of NULEF-H and NULEF-E operations, various modulation schemes may be used, in TDM and/or FDM. The modulation schemes may include one or more PSK modulations (e.g., QPSK) and/or one or more QAM modulations (e.g., 16QAM).

Figure 9:
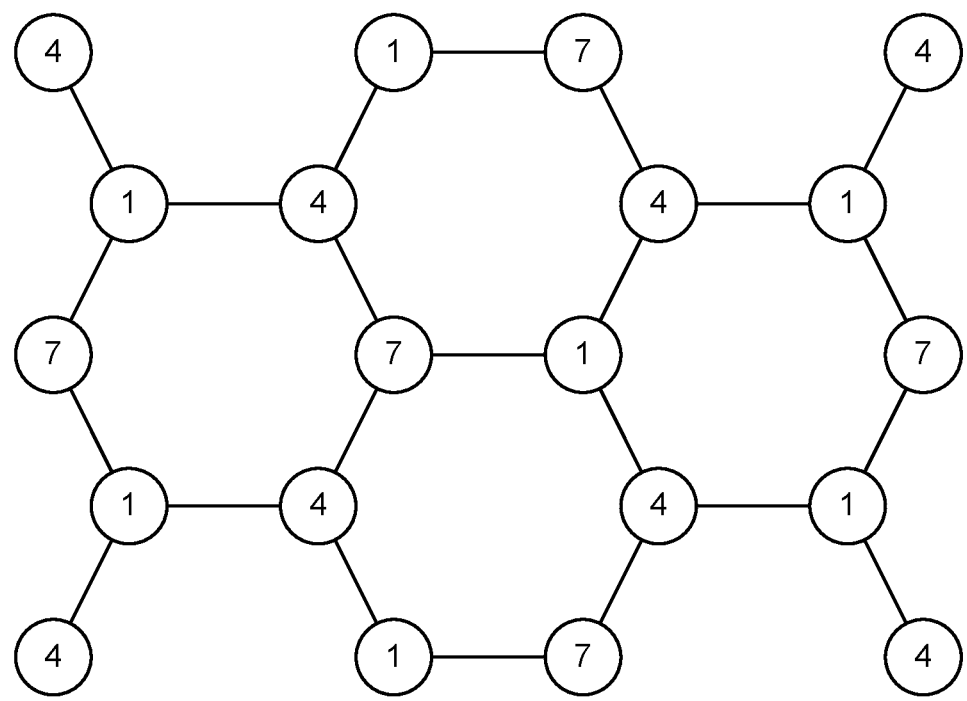
FIG. 9 illustrates an example distribution of frequency channels to mitigate interferences.

As indicated, magnetic fields such as NULEF-H fields attenuate with distance according to inverse cubic law. Thus, interferences between users is generally not problematic even if they are standing relatively close to each other. H-field interferences can be mitigated relatively easily using only three frequency channels of the eight currently available in NULEF-H as illustrated in FIG. 9.

On the other hand, E-fields attenuate with distance according to a law between inversely proportional and an inverse square law. One advantage of E-field for communication over H-field is that E-field can permit users to communicate if two (or more) persons are standing close together, and especially when they are touching. However, when multiple persons are close together, E-field communication can be problematic from a blocking view point since attenuation due to distance alone may not be sufficient. Thus, in an aspect, to provide a further measure of interference mitigation when using E-field for communications, a channel sounding may be performed to find a free channel before operating on that channel to avoid blocking. Of course, channel sounding may be performed for H-field communication as well.

It is indicated above that E-field can extend range of communication between TX and RX relative to H-field. This can be especially true when one or both of the TX and RX are in contact with human body. One (of many) exciting opportunity afforded through the proposed E-field communication is in medical applications where it could provide the means and channel to control artificial limbs such as hands, legs, feet, etc.

Figure 10:
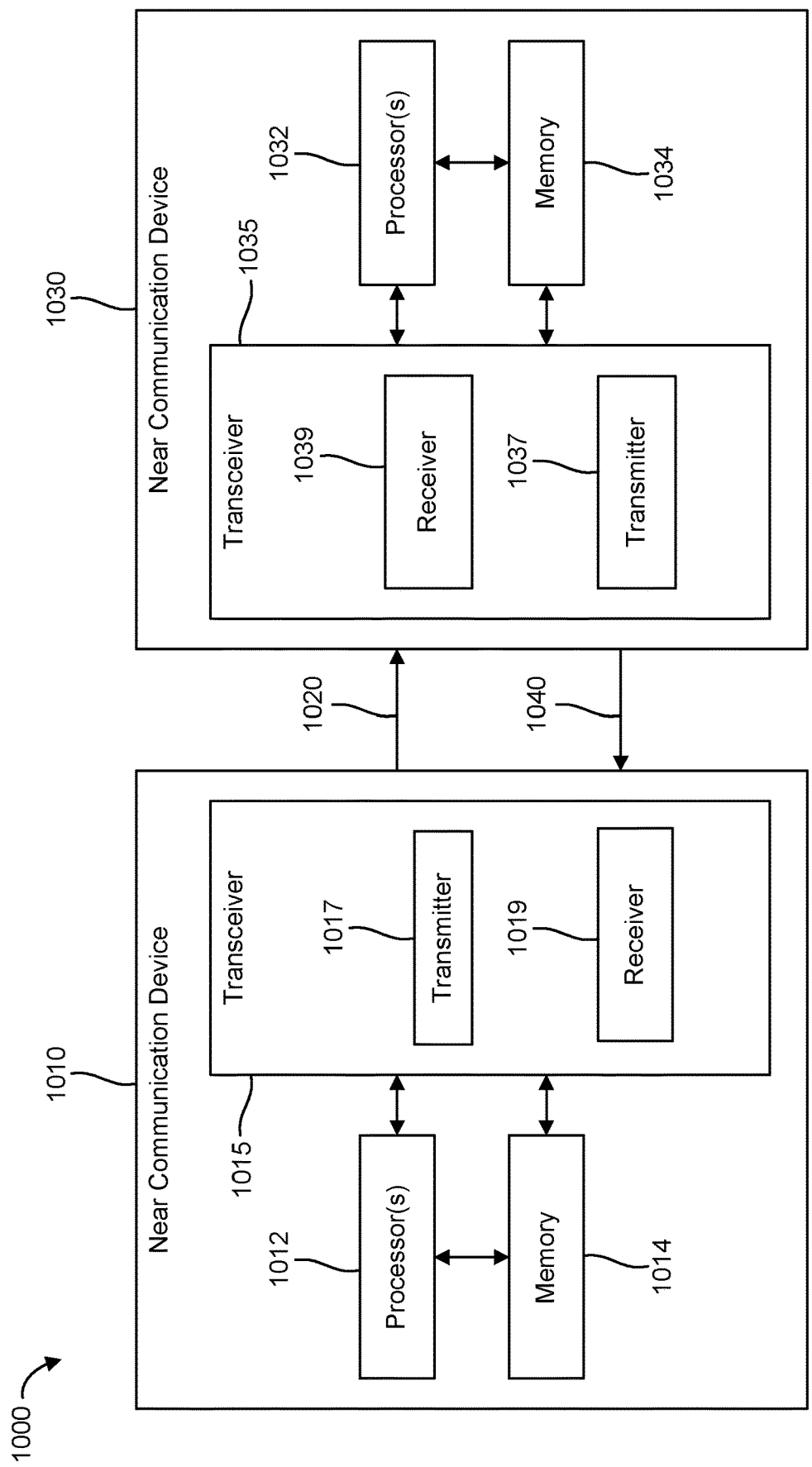
FIG. 10 illustrates an example of a near field communication system that includes multiple near communication devices.

FIG. 10 illustrates a near field communication system 1000 that includes at least first and second communication devices 1010, 1030. In an aspect, both of the first and second communication devices 1010, 1030 may be capable of near E-field communications. For example, the first and second communication devices 1010, 1030 may be NULEF devices capable of performing NULEF-E operations.

Alternatively or in addition thereto, one or both of the first and second near communications devices 1010, 1030 may also be capable of H-field communications. For example, the first and/or the second communication devices 1010, 1030 may be NULEF devices capable of performing NULEF-H operations.

Information from the first communication device 1010 to the second communication device 1030 may be transferred over a first link 1020. The first link 1020 may be an E-field link and/or an H-field link. Information from the second communication device 1030 to the first communication device 1010 may be transferred over a second link 1040. The second link 1040 may be E-field link or E and H-field link. The first and second links 1020, 1040 may both be wireless links.

In some aspects, the first and/or the second communication devices 1010 and/or 1030 may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. the first and/or the second communication devices 1010 and/or 1030 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar functioning device.

The first communication device 1010 may include one or more processors 1012, a memory 1014, and/or a transceiver 1015. The transceiver 1015 may comprise a transmitter (TX) 1017 and a receiver (RX) 1019. The transceiver 800 of FIG. 8 may be representative of the transceiver 1015. The TX 610 of FIG. 6 and/or the TX 710 may be representative of the TX 1017. Also, the RX 630 of FIG. 6 and/or the RX 710 may be representative of the RX 1019.

Similarly, the second communication device 1030 may include one or more processors 1032, a memory 1034, and/or a transceiver 1035. The transceiver 1035 may comprise a transmitter (TX) 1037 and a receiver (RX) 1039. The transceiver 800 of FIG. 8 may be representative of the transceiver 1035. The TX 610 of FIG. 6 and/or the TX 710 may be representative of the TX 1037. Also, the RX 630 of FIG. 6 and/or the RX 710 may be representative of the RX 1039.

The one or more processors 1012 and/or the memory 1014 in the first communication device 1010 may operate in combination with the transceiver 1015. Similarly, the one or more processors 1032 and/or the memory 1034 in the second communication device 1030 may operate in combination with the transceiver 1035.

It should be noted that the term "component" as used herein may be one of the parts that make up a system, may be hardware, firmware, and/or software, and may be divided into other components. The transceiver 1015/1035, the TX 1017/1037, and/or the RX 1019/1039 may be communicatively coupled to one or more additional components (e.g., processor(s) 1012/1032, memory 1014/1034) for transmitting, receiving, and/or processing E-field and/or H-field signals.

In an aspect, the RX 1019/1039 may include hardware, firmware, and/or software code executable by a processor (e.g., processor 1012/1032) for receiving data. The code may comprise instructions that are stored in a memory (e.g., computer-readable medium such as memory 1014/1034). The RX 1019/1039 may include a NULEF receiver capable of receiving E-field signals. The NULEF receiver may also be capable of receiving H-field signals.

In another aspect, the TX 1017/1037 may include hardware, firmware, and/or software code executable by a processor (e.g., processor 1012/1032) for transmitting data. The code may comprise instructions that are stored in a memory (e.g., computer-readable medium such as memory 1014/1034). The TX 1017/1037 may include a NULEF transmitter capable of transmitting E-field signals. The NULEF transmitter may also be capable of transmitting H-field signals.

In some aspects, various functions related to the transceiver 1015/1035 may be executed by a single processor. In other aspects, different functions may be executed by a combination of two or more different processors. The one or more processors 1012/1032 may include any one or any combination of a modem processor, or a baseband processor, or a digital signal processor (DSP), or a transmit processor, or a transceiver processor associated with the transceiver 1015/1035.

The one or more processors (e.g., processor 1012/1032) in the communication device (e.g., device 1010/1030) may execute or process instructions stored in a memory (e.g., memory 1014/1034) to assist/support or direct/instruct operation(s) of the TX 1017/1037 and/or the RX 1019/1039.

Figure 11:
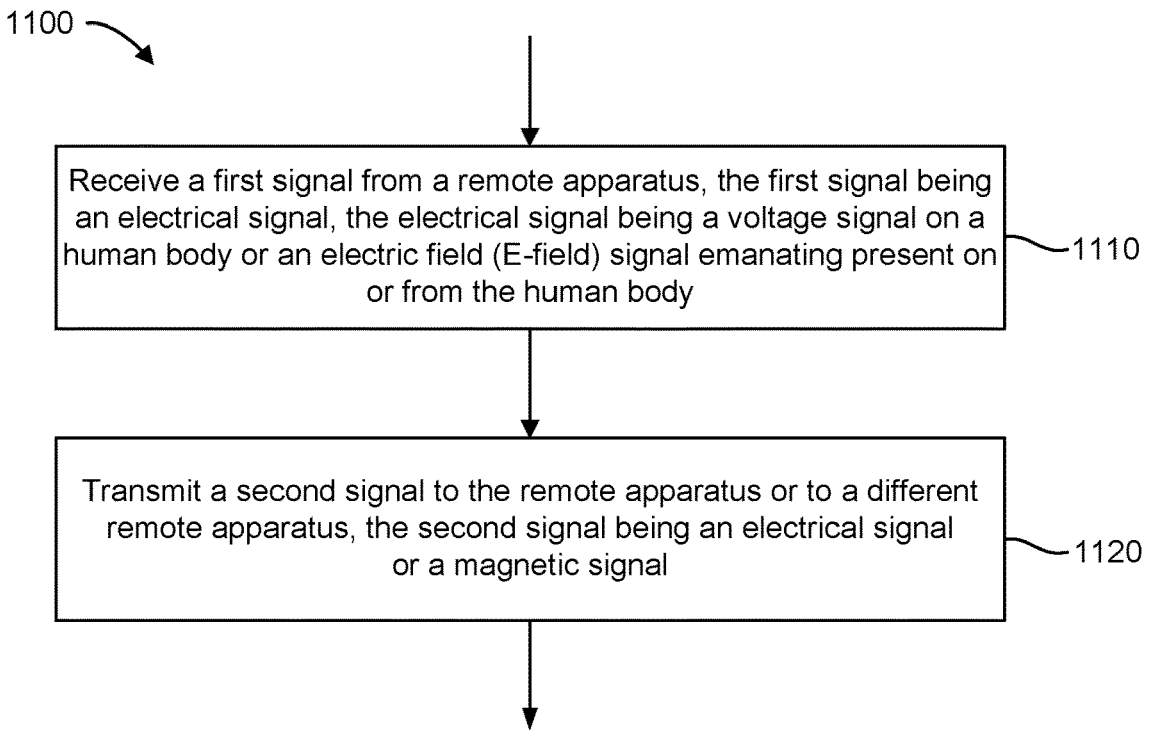
FIG. 11 illustrates a flow chart of an example method performed by an apparatus configured to perform near field communications.

FIG. 11 illustrates a flow chart of an example method 1100 performed by an apparatus configured to perform near field communication. For example, the apparatus may be a near ultra low energy field (NULEF) apparatus. Both transmission and reception operations are included in the method. However, the method 1100 initially focuses on reception of an electrical signal. The apparatus may comprise a processor, a memory, and a transceiver. The processor may be operatively coupled with the memory and/or the transceiver. One or both of the first and second near communication devices 1010 and 1030 of FIG. 10 may be representative of the apparatus.

At block 1110, the apparatus (e.g., first communication device 1010) may receive a first signal from a remote apparatus (e.g., second communication device 1030). The first signal may an electrical signal. That is, the first signal may be an electrical signal. The electrical signal may be voltage signal on a human body. Alternatively or in addition thereto, the electrical signal may be an E-field present on or emanating from the human body. For example, the first signal may be a NULEF-E signal.

A transceiver (e.g., transceiver 1015) may be configured to detect, as the first signal, the voltage on the human body and/or the E-field present on or emanating from the human body. The transceiver (e.g., transceiver 1015) may include a receiver (e.g., receiver 1019), and the receiver itself may comprise a field receiver (e.g., field receiver 635, 735, 825). The field receiver may comprise an antenna coil, a plane plate, or a combination thereof. The first signal maybe received when the field receiver is capacitively coupled with the human body, which can occur when the field receiver is brought close to the human body (e.g., within 20 cm).

Indeed, the field receiver may be brought into contact with the human body. This may be particularly preferred if the transmitter of the remote apparatus (e.g., transmitter 1037 of the second communication device 1030) is not in contact with the human body. On the other hand, if the transmitter of the remote apparatus is in contact with the human body, then the field receiver of the apparatus can be in contact, but need not necessarily be in contact.

For electrical communications, it may be desirable to have the wavelength of the first signal be greater than the height of a human being. For example, the wavelength can be 3 m or more (e.g., frequency can be 100 MHz or less). The field receiver can be a planar antenna coil (antcoil), a plane plate, or a combination of both. In general, it is preferred that the field receiver be shaped to enhance capacitive coupling. If magnetic communication is contemplated, then it may be preferred that the field receiver comprise at least the antcoil.

At block 1120, the apparatus (e.g., first communication device 1010) may transmit a second signal to the same remote apparatus (e.g., second communication device 1030) or to a different remote apparatus. The second signal may an electrical signal or a magnetic signal. For example, the second signal may be a NULEF-E signal or a NULEF-H signal.

The transceiver (e.g., transceiver 1015) may include a transmitter (e.g., transmitter 1017), and the transmitter itself may comprise a field producer (e.g., field producer 615, 715, 825). If the second signal is an electrical signal, the second electrical signal may transmitted when the field producer is capacitively coupled with the human body. If the field producer is in contact with the human body, the second electrical signal may be a voltage signal induced onto the human body by the field producer. If the field producer is not in contact with the human body, then the second electrical signal may be an E-field signal provided to the human body by the field producer when it is brought close to the human body (e.g., within 20 cm).

If the second signal is a magnetic signal, then in an aspect, a frequency band of the first signal (of the electrical signal) may overlap with a frequency band of the second signal (of the magnetic signal) at least in part. Alternatively, the frequency band of the first signal may be higher than the frequency band of the second signal. For example, the frequency band of the second (magnetic) signal may range between 9-22 MHZ while the frequency band of the first (electrical) signal may range between 22-44 MHz or higher (e.g., up to 50 MHz or even up to 100 MHz).

Figure 12:
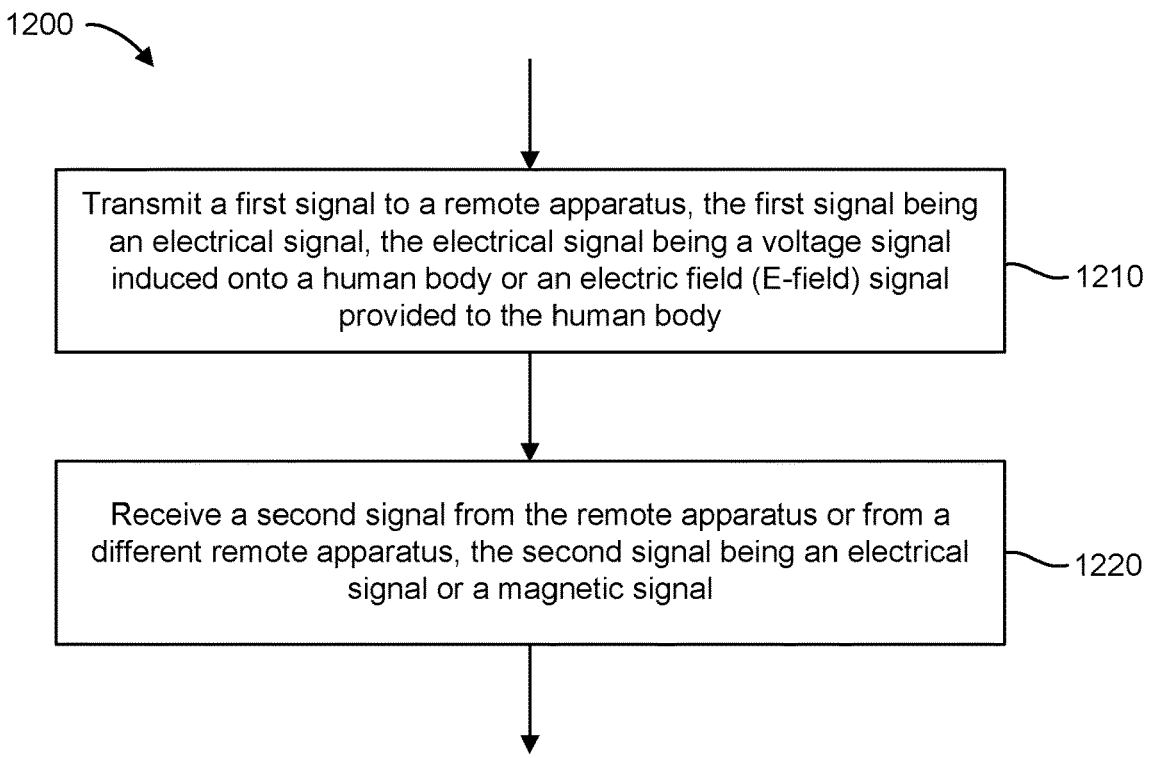
FIG. 12 illustrates a flow chart of another example method performed by an apparatus configured to perform near field communications.

FIG. 12 illustrates a flow chart of an example method 1200 performed also by an apparatus (e.g., NULEF apparatus) configured to perform near field communication. Similar to method 1100, both transmission and reception operations are included in the method. But unlike method 1100, method 1200 initially focuses on transmission of an electrical signal. The apparatus may comprise a processor, a memory, and a transceiver. The processor may be operatively coupled with the memory and/or the transceiver. One or both of the first and second near communication devices 1010 and 1030 of FIG. 10 may be representative of the apparatus.

At block 1210, the apparatus (e.g., first communication device 1010) may transmit a first signal to a remote apparatus (e.g., second communication device 1030). The first signal may an electrical signal. That is, the first signal may be a voltage signal induced onto the human body by a transceiver (e.g., transceiver 1015) of the apparatus. Alternatively or in addition thereto, the first signal may be an E-field provided to the human body by the transceiver. For example, the first signal may be a NULEF-E signal.

The transceiver (e.g., transceiver 1015) may include a transmitter (e.g., transmitter 1017), and the transmitter itself may comprise a field producer (e.g., field producer 615, 715, 825). The field producer may comprise an antenna coil, a plane plate, or a combination thereof. The first signal maybe transmitted when the field producer is capacitively coupled with the human body, which can occur when the field producer is brought close to the human body (e.g., within 20 cm).

The field producer may be brought into contact with the human body. In this instance, the field producer may provide the voltage signal directly to the human body. Direct contact may be particularly preferred if the receiver of the remote apparatus (e.g., receiver 1039 of the second communication device 1030) is not in contact with the human body. On the other hand, if the receiver of the remote apparatus is in contact with the human body, then the field producer of the apparatus can be in contact, but need not necessarily be in contact.

The wavelength of the first signal may be greater than human body, e.g., 3 m or more. The field producer can be an antcoil, a plane plate, or a combination of both. If magnetic communication is contemplated, then it may be preferred that the field producer comprise at least the antcoil.

At block 1220, the apparatus (e.g., first communication device 1010) may receive a second signal from the same remote apparatus (e.g., second communication device 1030) or from a different remote apparatus. The second signal may an electrical signal or a magnetic signal. For example, the second signal may be a NULEF-E signal or a NULEF-H signal.

The transceiver (e.g., transceiver 1015) may include a receiver (e.g., receiver 1019), and the receiver itself may comprise a field receiver (e.g., field receiver 635, 735, 825). If the second signal is an electrical signal, the second electrical signal may received when the field receiver is capacitively coupled with the human body. The second electrical signal may be a voltage signal if the field receiver is in contact with the human body. If the is not in contact with the human body, then the second electrical signal may be an E-field signal present on or emanating from the human body when the field receiver is brought close to the human body (e.g., within 20 cm).

If the second signal is a magnetic signal, then in an aspect, a frequency band of the first signal (of the electrical signal) may overlap with a frequency band of the second signal (of the magnetic signal) at least in part. Alternatively, the frequency band of the first signal may be higher than the frequency band of the second signal. For example, the frequency band of the second (magnetic) signal may range between 9-22 MHZ while the frequency band of the first (electrical) signal may range between 22-44 MHz or higher (e.g., up to 50 MHz or even up to 100 MHz).

Figure 13:
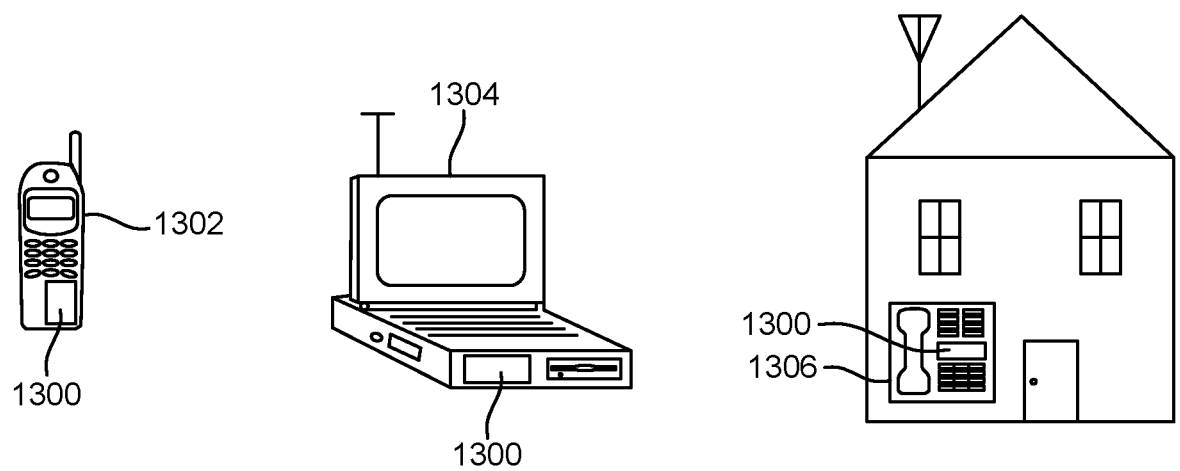
FIG. 13 illustrates examples of devices with an apparatus integrated therein.

FIG. 13 illustrates various electronic devices that may be integrated with the aforementioned apparatus configured to perform near field communication as illustrated in FIG. 10. For example, a mobile phone device 1302, a laptop computer device 1304, a terminal device 1306 as well as security devices that incorporate the near field communication apparatus as described herein may include an apparatus 1300. The apparatus 1300 may be a standalone device, such as a sensor, a fixed sensor, an IoT (Internet of Things) device, etc. The devices 1302, 1304, 1306 illustrated in FIG. 13 are merely exemplary. Other electronic devices may also feature the apparatus 1300 including, but not limited to, a group of devices (e.g., electronic devices) that includes security devices, mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. An apparatus configured to perform near field communications, the apparatus comprising:
   a transceiver comprising a receiver (RX) comprising a field receiver;
   a memory; and
   a processor operatively coupled with the transceiver and the memory,
   wherein the processor is configured to receive a first signal from a remote apparatus through the field receiver of the receiver when a receive antenna coil (antcoil) of the field receiver forms a coupling capacitor with the remote apparatus via a human body, the first signal being an electrical signal transmitted via the coupling capacitor, the electrical signal being a voltage signal on the human body or an electric field (E-field) signal present on or emanating from the human body,
   wherein the field receiver is configured to receive the first signal as the electrical signal only, and
   wherein the transceiver is configured to receive the first signal that has an operation frequency of equal to or greater than 22 MHz.

2. The apparatus of claim 1, wherein the transceiver is configured to receive the first signal that has the operation frequency ranging from 22 MHz to 100 MHz, such that a wavelength of the first signal is three meters or longer.

3. The apparatus of claim 1, wherein the field receiver is in contact with the human body.

4. The apparatus of claim 3, wherein the field receiver is in contact with the human body when a transmitter of the remote apparatus is not in contact with the human body.

5. The apparatus of claim 1, wherein the field receiver is not in contact with the human body when a transmitter of the remote apparatus is in contact with the human body.

6. The apparatus of claim 1, wherein the field receiver comprises the receive antcoil or a combination of the receive antcoil and a plane plate, the receive antcoil being a planar antenna coil.

7. The apparatus of claim 1, wherein the processor, the memory, and/or the transceiver are further configured to transmit a second signal to the remote apparatus or to a different remote apparatus, the second signal being an electrical signal or a magnetic signal.

8. The apparatus of claim 7,
wherein the second signal is an electrical signal,
wherein the transceiver includes a transmitter (TX) comprising a field producer configured to capacitively couple with the human body, and
wherein the processor is configured to transmit the second signal through the field producer of the transmitter when a transmit antcoil of the field producer is capacitively coupled with the human body.

9. The apparatus of claim 7,
wherein the second signal is a magnetic signal, and
wherein a frequency band of the first signal overlaps, at least in part, with a frequency band of the second signal.

10. The apparatus of claim 7,
wherein the second signal is a magnetic signal, and
wherein a frequency band of the first signal is higher than a frequency band of the second signal.

11. The apparatus of claim 1, wherein the first signal is a near ultra low energy field (NULEF) signal.

12. An apparatus configured to perform near field communications, the apparatus comprising:
a transceiver comprising a transmitter (TX) comprising a field producer;
a memory; and
a processor operatively coupled with the transceiver and the memory,
wherein the processor is configured to transmit a first signal to a remote apparatus through the field producer of the transmitter when a transmit antenna coil (antcoil) of the field producer forms a coupling capacitor with the remote apparatus via a human body, the first signal being an electrical signal transmitted via the coupling capacitor, the electrical signal being a voltage signal induced onto the human body or an electric field (E-field) signal provided to the human body,
wherein the field producer is configured to transmit the first signal as the electrical signal only, and
wherein the transceiver is configured to transmit the first signal that has an operation frequency of equal to or greater than 22 MHz.

13. The apparatus of claim 12, wherein the transceiver is configured to transmit the first signal that has the operation frequency ranging from 22 MHz to 100 MHz, such that a wavelength of the first signal is three meters or longer.

14. The apparatus of claim 12, wherein the field producer is in contact with the human body.

15. The apparatus of claim 14, wherein the field producer is in contact with the human body when a receiver of the remote apparatus is not in contact with the human body.

16. The apparatus of claim 12, wherein the field producer is not in contact with the human body when a receiver of the remote apparatus is in contact with the human body.

17. The apparatus of claim 12, wherein the field producer comprises the transmit antcoil or a combination of the transmit antcoil and a plane plate, the transmit antcoil being a planar antenna coil.

18. The apparatus of claim 12, wherein the processor, the memory, and/or the transceiver are further configured to receive a second signal from the remote apparatus or from a different remote apparatus, the second signal being an electrical signal or a magnetic signal.

19. The apparatus of claim 18,
wherein the second signal is an electrical signal,
wherein the transceiver includes a receiver (RX) comprising a field receiver configured to capacitively couple with the human body, and
wherein the processor is configured to receive the second signal through the field receiver of the receiver when a receive antcoil of the field receiver is capacitively coupled with the human body.

20. The apparatus of claim 18,
wherein the second signal is a magnetic signal, and
wherein a frequency band of the first signal overlaps, at least in part, with a frequency band of the second signal.

21. The apparatus of claim 18,
wherein the second signal is a magnetic signal, and
wherein a frequency band of the first signal is higher than a frequency band of the second signal.

22. The apparatus of claim 12, wherein the first signal is a near ultra low energy field (NULEF) signal.

23. A method of an apparatus configured to perform near field communications, the method comprising:
receiving a first signal from a remote apparatus through a receiver (RX) of the apparatus when a receive antenna coil (antcoil) of the receiver forms a coupling capacitor with the remote apparatus via a human body, the first signal being an electrical signal transmitted via the coupling capacitor, the electrical signal being a voltage signal on the human body or an electric field (E-field) signal present on or emanating from the human body; and
processing the first signal that has an operation frequency of equal to or greater than 22 MHz,
wherein the first signal is received as the electrical signal only.

24. The method of claim 23, further comprising:
transmitting a second signal to the remote apparatus or to a different remote apparatus through a transmitter (TX) of the apparatus when a transmit antcoil of the transmitter is capacitively coupled with the human body, the second signal being an electrical signal or a magnetic signal.

25. A method of an apparatus configured to perform near field communications, the method comprising:
generating a first signal that has an operation frequency of equal to or greater than 22 MHz; and
transmitting the first signal to a remote apparatus through a transmitter (TX) of the apparatus when a transmit antennal coil (antcoil) of the transmitter forms a coupling capacitor with the remote apparatus via a human body, the first signal being an electrical signal transmitted via the coupling capacitor, the electrical signal being a voltage signal induced onto the human body or an electric field (E-field) signal provided to the human body,
wherein the first signal is transmitted as the electrical signal only.

26. The method of claim 25, further comprising:
receiving a second signal from the remote apparatus or from a different remote apparatus through a receive antcoil of the apparatus when the receive antcoil is capacitively coupled with the human body, the second signal being an electrical signal or a magnetic signal.

27. The method of claim 24,
wherein the transmit antcoil is in contact with the human body, or
wherein the transmit antcoil is not in contact with the human body when a receiver of the remote apparatus is in contact with the human body.

28. The method of claim 23,
wherein the receive antcoil is in contact with the human body, or
wherein the receive antcoil is not in contact with the human body when a transmitter of the remote apparatus is in contact with the human body.

29. The method of claim 26,
wherein the receive antcoil is in contact with the human body, or
wherein the receive antcoil is not in contact with the human body when a transmitter of the remote apparatus is in contact with the human body.

30. The method of claim 25,
wherein the transmit antcoil is in contact with the human body, or
wherein the transmit antcoil is not in contact with the human body when a receiver of the remote apparatus is in contact with the human body.

31. The method of claim 23, wherein the processed first signal has the operation frequency ranging from 22 MHz to 100 MHz.

32. The method of claim 25, wherein the generated first signal has the operation frequency ranging from 22 MHz to 100 MHz.

* * * * *